(12) United States Patent
Sørensen

(10) Patent No.: US 11,997,953 B2
(45) Date of Patent: Jun. 4, 2024

(54) GRAIN SEPARATING APPARATUS FOR A COMBINE HARVESTER AND A METHOD FOR SEPARATING GRAIN FROM STRAW MATERIAL

(71) Applicant: Jakob Balling Bro Sørensen, Hammel (DK)

(72) Inventor: Jakob Balling Bro Sørensen, Hammel (DK)

(73) Assignee: Jakob Sørensen IP APS, Hammel (DK)

( * ) Notice: Subject to any disclaimer, the term of this patent is extended or adjusted under 35 U.S.C. 154(b) by 541 days.

(21) Appl. No.: 17/287,876

(22) PCT Filed: Nov. 4, 2019

(86) PCT No.: PCT/DK2019/050330
§ 371 (c)(1),
(2) Date: Apr. 22, 2021

(87) PCT Pub. No.: WO2020/094195
PCT Pub. Date: May 14, 2020

(65) Prior Publication Data
US 2021/0392819 A1    Dec. 23, 2021

(30) Foreign Application Priority Data

Nov. 6, 2018 (DK) .......................... PA 2018 70730

(51) Int. Cl.
*A01F 12/34* (2006.01)
*A01F 12/30* (2006.01)
(Continued)

(52) U.S. Cl.
CPC .............. *A01F 12/34* (2013.01); *A01F 12/30* (2013.01); *A01F 12/444* (2013.01); *A01F 17/02* (2013.01)

(58) Field of Classification Search
CPC ........ A01F 12/34; A01F 12/30; A01F 12/444; A01F 17/02; A01F 12/305; A01F 12/32
See application file for complete search history.

(56) References Cited

U.S. PATENT DOCUMENTS

| 2,719,524 A | 10/1955 | Brinkley |
| 2,970,599 A | 2/1961 | Jeantil |

(Continued)

FOREIGN PATENT DOCUMENTS

| BE | 834544 A | * 4/1976 | ........... A01F 12/305 |
| DE | 413515 C | 5/1925 | |

(Continued)

OTHER PUBLICATIONS

Denmark Search Report for PA 2018 70730, dated May 6, 2019, 4 pgs.

*Primary Examiner* — Arpad Fabian-Kovacs
(74) *Attorney, Agent, or Firm* — Blank Rome LLP

(57) ABSTRACT

A grain separating apparatus (1) for a combine harvester (2). The grain separating apparatus (1) has at least a first walker-sieve (3) and a second walker-sieve (4) arranged side by side, wherein the first walker-sieve (3) and the second walker-sieve (4) are suspended in at least two suspension points (5,6) in the combine harvester (2) and wherein at least one of the two suspension points (5,6) is arranged to describe a rotational motion. A rotational motion drive (7) is arranged to drive the rotational motion of the first walker-sieve (3) out of phase with the rotational motion of the second walker-sieve (4), wherein each of the at least two walker-sieves (3,4) include a straw walker (8) comprising drivers (9) for conveying a straw material (10) and wherein grain (11) and debris (12) are separated from the straw material (10) through walker apertures (13) arranged in the straw walker (8). Furthermore, the straw walker (8) is arranged on top of at least one sieve (14,15) which is (Continued)

Figure 1:
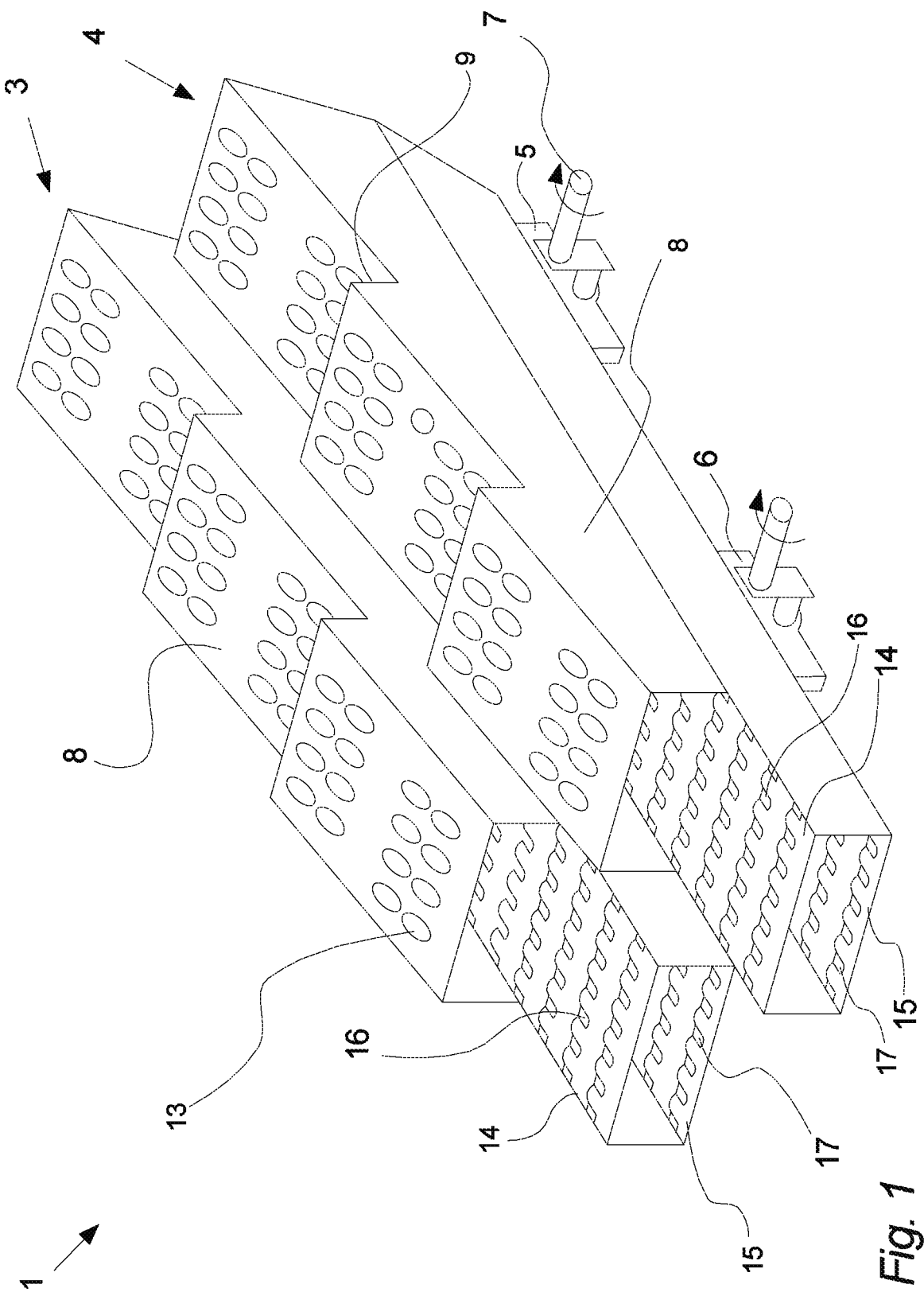

arranged to separate grain (11) from the debris (12) and wherein the straw walker (8) and the at least one sieve (14,15) are rigidly connected. Furthermore, a method for separating grain (11) from straw material (10) in a combine harvester (2) by a grain separating apparatus (1) as described above.

14 Claims, 5 Drawing Sheets

(51) Int. Cl.
*A01F 12/44* (2006.01)
*A01F 17/02* (2006.01)

(56) References Cited

U.S. PATENT DOCUMENTS

| | | | | |
|---|---|---|---|---|
| 3,478,750 | A * | 11/1969 | Dahlquist | A01F 12/30 460/85 |
| 3,599,644 | A * | 8/1971 | Bichel | A01F 12/32 460/85 |
| 3,646,373 | A | 2/1972 | Hayes | |
| 3,897,332 | A | 7/1975 | Delfosse et al. | |
| 4,392,500 | A | 7/1983 | Houle | |
| 5,487,703 | A * | 1/1996 | Kuchar | A01F 12/30 460/96 |
| 6,106,389 | A * | 8/2000 | Perez-Lopez | A01F 12/305 460/85 |
| 6,190,253 | B1 * | 2/2001 | Preece | A01F 12/305 460/85 |
| 10,034,430 | B2 * | 7/2018 | Missotten | A01D 41/1276 |
| 2006/0276240 | A1 * | 12/2006 | Spechtel | A01F 12/30 460/85 |
| 2006/0281506 | A1 * | 12/2006 | Weichholdt | A01F 12/444 460/101 |
| 2020/0236859 | A1 * | 7/2020 | Kuchar | B07B 1/4654 |

FOREIGN PATENT DOCUMENTS

| | | | | |
|---|---|---|---|---|
| DE | 919676 | C | 11/1954 | |
| DE | 2426731 | A * | 12/1975 | A01F 12/305 |
| DE | 3907836 | A1 * | 9/1990 | A01F 12/30 |
| DE | 102004023767 | A1 * | 11/2005 | A01D 41/1276 |
| DE | 102018221418 | A1 * | 6/2020 | A01F 12/30 |
| EP | 2606713 | A1 * | 6/2013 | A01F 12/305 |
| EP | 3111743 | A1 | 1/2017 | |
| FR | 2232911 | A * | 2/1975 | A01F 12/305 |
| JP | 3294129 | B2 | 6/2002 | |
| WO | WO-8100502 | A1 * | 3/1981 | A01F 12/30 |
| WO | WO-02/03775 | A2 | 1/2002 | |
| WO | WO-2021155453 | A1 * | 8/2021 | A01F 12/32 |

\* cited by examiner

GRAIN SEPARATING APPARATUS FOR A COMBINE HARVESTER AND A METHOD FOR SEPARATING GRAIN FROM STRAW MATERIAL

RELATED APPLICATIONS

This application is a national phase of PCT/DK2019/050330, filed on Dec. 20, 2019, which claims the benefit of Danish Patent Application No. PA 2018 70730, filed on Nov. 6, 2018. The entire contents of these applications are hereby incorporated by reference.

FIELD OF THE INVENTION

The invention relates to a grain separating apparatus for a combine harvester. The invention further relates to a method for separating grain from straw material in a combine harvester.

BACKGROUND OF THE INVENTION

Combine harvesters constitute an important machinery within the field of agriculture for efficiently harvesting a variety of crops. A combine harvester traditionally includes, in its essence, a chassis with driver compartment, a header, a threshing system, straw walkers, sieves and a storage tank. When harvesting crops, the combine harvester drives along the field such that the cutter bar arranged in the header cuts and collects the crops which are afterwards fed to the threshing system which threshes and beats the cut straw material for releasing the grains from the crop stalks. Some of the grains are released from the stalks and are transported to a grain storage tank e.g. via augers, while the straw material, still containing grains, proceeds to the straw walkers, which convey the straw material towards the back of the machine while more grains fall therethrough. Below the straw walkers is placed a grain pan for intercepting the falling grain, smaller straw pieces and chaffs. This material then moves towards a sieve which is positioned below the grain pan and which shake and vibrate to separate the grains from the chaff and straw pieces, where after the cleaned grain may be transported to the grain storage tank.

However, the components of the straw walkers and cleaning systems according to the prior art are comprised of a plurality of complex mechanisms for providing the dynamic motions of the sieves and straw walkers. As a result of this, straw walkers and cleaning devices of the prior art are space demanding and difficult to maintain due to their complexity.

It is therefore an object of the present invention to provide for a grain separating device which solves the above-mentioned problems.

THE INVENTION

The invention provides for a grain separating apparatus for a combine harvester. The grain separating apparatus comprises at least a first walker-sieve and a second walker-sieve arranged side by side, wherein the first walker-sieve and the second walker-sieve are suspended in at least two suspension points in the combine harvester and wherein at least one of the two suspension points is arranged to describe a rotational motion. A rotational motion drive is arranged to drive said rotational motion of the first walker-sieve out of phase with the rotational motion of the second walker-sieve, wherein each of the at least two walker-sieves include a straw walker comprising drivers for conveying a straw material and wherein grain and debris are separated from the straw material through walker apertures arranged in the straw walker. Furthermore, the straw walker is arranged on top of at least one sieve which is arranged to separate grain from the debris and wherein the straw walker and the at least one sieve are rigidly connected.

Fixing each of the straw walkers rigidly to its own underlying sieve to form neighbouring walker-sieves is advantageous in that the straw conveying and cleaning process hereby can be driven by the same drive means, thus enabling that the straw conveying and cleaning process can be arranged in a compact and rigid unit. As a result of this compactness, the mechanical complexity is reduced whereby the maintenance of the combine harvester cleaning device is eased.

In this context, the term "drivers" should be understood as teeth, carrier arms, protruding rods, paddles or other drive means suitable for being arranged on the surface of the straw walker and for engaging the straw material such that it is effectively conveyed. It should be understood that the drivers do not necessarily have to extend all the way across the width of the walker-sieves, in that in one embodiment the drivers would only be formed along the edges of the straw walker so that the walker apertures are arranged in a substantially flat upper surface of the straw walker.

In this context, the term "grain" should be understood as the seeds from corn, wheat, rye, maize, barley, spelt, rapeseed or any other type of crops which may be harvested by the use of a combine harvester.

In this context, the term "rotational motion" should be understood as the kinematic movement of a point which describes a circular, oval, elliptic or any other more or less complex rotational curve or any other type of rotational motion.

In this context, the term "rotational motion drive" should be understood as a mechanism which induces the rotational motion of at least one of the suspension points. It could comprise one or more dedicated motors, a transmission system for allowing a drive connection to an exciting motor in combined harvester, pneumatic or hydraulic cylinders or other combined with a crank mechanism (such as a crankshaft), disc with eccentric hole, planetary gears, pulley system or any other kind of mechanism for driving a rotational motion.

In this context, the term "straw material" should be understood as the entire crop as it is harvested—i.e. comprising the stalks, stems, hay, grass, chaffs, ears, leaf, grains and other parts.

In this context, the term "debris" should be understood as the chaff, leaves, straw fragments, small stones, or any other kind of small, unwanted material which may be introduced in the cleaning device together with the grain.

In this context, the term "rigidly connected" should be understood as a joining method such as welding, bolting, clicking, screwing or other joining method which joins each of the straw walkers and the sieves firmly and fixedly together.

In this context, the term "walker apertures" should be understood as perforations, lamella gaps, holes or other type of cavity in the straw walker for allowing grain to fall through. Furthermore, it should be understood that the size of the walker apertures is not necessarily fixed and it may be adjusted e.g. according to different crops to be harvested.

In an aspect of the invention the rotational motion drive comprises a crank mechanism.

Using a motion driver which comprises a crank mechanism is advantageous in that a simple method for inducing an even, circular motion on each of the walker-sieves is achieved and wherein the circular motion of each of the walker-sieves is offset in relation to each other.

In an aspect of the invention the width of the walker-sieve is between 20 mm and 2000 mm, preferably between 50 mm and 800 mm and most preferred between 100 mm and 450 mm.

It is advantageous to form the walker-sieve in the above-mentioned ranges in that a plurality of walker sieves may be arranged side by side for utilizing the width of the combine harvester. Furthermore, different number of walker-sieves may be arranged side by side depending on the combine harvester model which is advantageous in that it is easy to adapt the cleaning device to different combine harvester models and sizes.

In an aspect of the invention the straw walker and the at least one sieve are welded together.

Welding the straw walker and the at least one sieve is advantageous in that a strong and rigid connection is obtained.

In an aspect of the invention the grain separating apparatus further comprises a blower.

It is advantageous if the grain separating apparatus further comprises a blower in that an airflow may be used to aid the separation of the grain from the straw material and the debris.

In this context, the term "blower" should be understood as a device for establishing an airflow such as an axial-flow fan, cross-flow fan, mixed flow fan, centrifugal blower, compressor or other.

In an aspect of the invention the blower is arranged to form an airflow through the walker apertures and the at least one sieve.

It is advantageous to establish an air current through the straw walker perforations in that a pneumatic force is generated which suspends the light and unwanted debris between the at least one sieve and walker apertures and simultaneously forces the unwanted material backwards and towards the end of the combine harvester while grain—having a larger density—is allowed to fall through the straw walker apertures and sieves.

In an aspect of the invention the drivers are formed as teeth extending substantially away from the at least one sieve.

It is advantageous to provide the surface of the straw walker with carrier elements formed as sawtooth in that the straw material is effectively engaged and conveyed backwards towards the end of the combine harvester.

In an aspect of the invention the at least one sieve comprises a first sieve arranged under the straw walker and a second sieve arranged under the first sieve and wherein the first sieve and the second sieve are rigidly connected to each other.

It is advantageous to provide the sieve from at least two layers of sieves below the straw walker in that a two-step cleaning is provided e.g. enabling a primary sorting and a secondary sorting of different fineness or simply to increase the effectiveness of the sieve substantially without increasing the size. Furthermore, rigidly connecting the sieves is advantageous in that they follow the same motion as the straw walkers.

In an aspect of the invention the average size of first sieve apertures in the first sieve is larger than an average size of second sieve apertures in the second sieve.

It is advantageous to form the first sieve perforations larger than the second sieve perforations in that debris are gradually and progressively sorted from the grain and that chaffs, which may have passed through the first sieve, are filtered away by the second sieve.

Furthermore, the invention provides for a method for separating grain from straw material in a combine harvester by means of a grain separating apparatus comprising at least a first walker-sieve and a second walker-sieve arranged side by side. Each of the first walker-sieve and the second walker-sieve comprise a straw walker comprising drivers for conveying a straw material, wherein the straw walker is arranged on top of and rigidly connected to at least one sieve. The first walker-sieve and the second walker-sieve are suspended in at least two suspension points in the combined harvester. The method comprises the steps of conveying the straw material by means of drivers on the straw walkers and by rotating at least one suspension point of the first walker-sieve and the second walker-sieve out of phase with each other to make the walker-sieves describe a walking-like motion, separating grain and debris from the straw material through walker apertures arranged in the straw walkers at least also by means of the walker-like motion, separating the grain from the debris by means of the underlying sieves.

Using the invention for grain cleaning according to the above-mentioned method is advantageous in that a compact cleaning device is achieved in that it comprises less complex and moving parts than cleaning apparatuses of the prior art. Therefore, the manufacturing of the cleaning device is made cheaper and it is also made easier to maintain this part of the combine harvester.

In an aspect of the invention the grain and debris are also separated from the straw material on the straw walkers by establishing a walker airflow up through the walker apertures towards the straw material.

It is advantageous to establish a walker airflow towards the straw material in that the straw material is hereby fluidised and thereby the displacement of the separation of the higher-density articles (grain) downwards is eased and in that the unwanted material (straw, grass, leaves, chaffs etc) are suspended on the surface of the straw walker and carried away by the walking-like motion.

In an aspect of the invention, separation of the grain from the debris by means of the underlying sieves is aided by establishing a sieve airflow up through the sieves towards the straw walkers.

It is advantageous to generate a sieve air current up through the sieves in that any chaff which may have passed through the walker apertures is suspended between the straw walker and the sieve and conveyed backwards due to the air flow and the walking-like motion of the walker-sieve.

In an aspect of the invention the walker airflow and the sieve airflow are established by the same blower.

It is advantageous to use the same fan for generating the walker and sieve air current in that the cleaning device may be formed more compact. Furthermore, regulating the airflow is simplified in that only one blower must be controlled whereby the controlling system and calibration of the blower is simplified.

A method according to any of the previously discussed methods, wherein the method is a method for separating grain from straw material by means of a grain separating apparatus according to any of the previously discussed grain separating apparatus.

FIGURES

Figure 2:
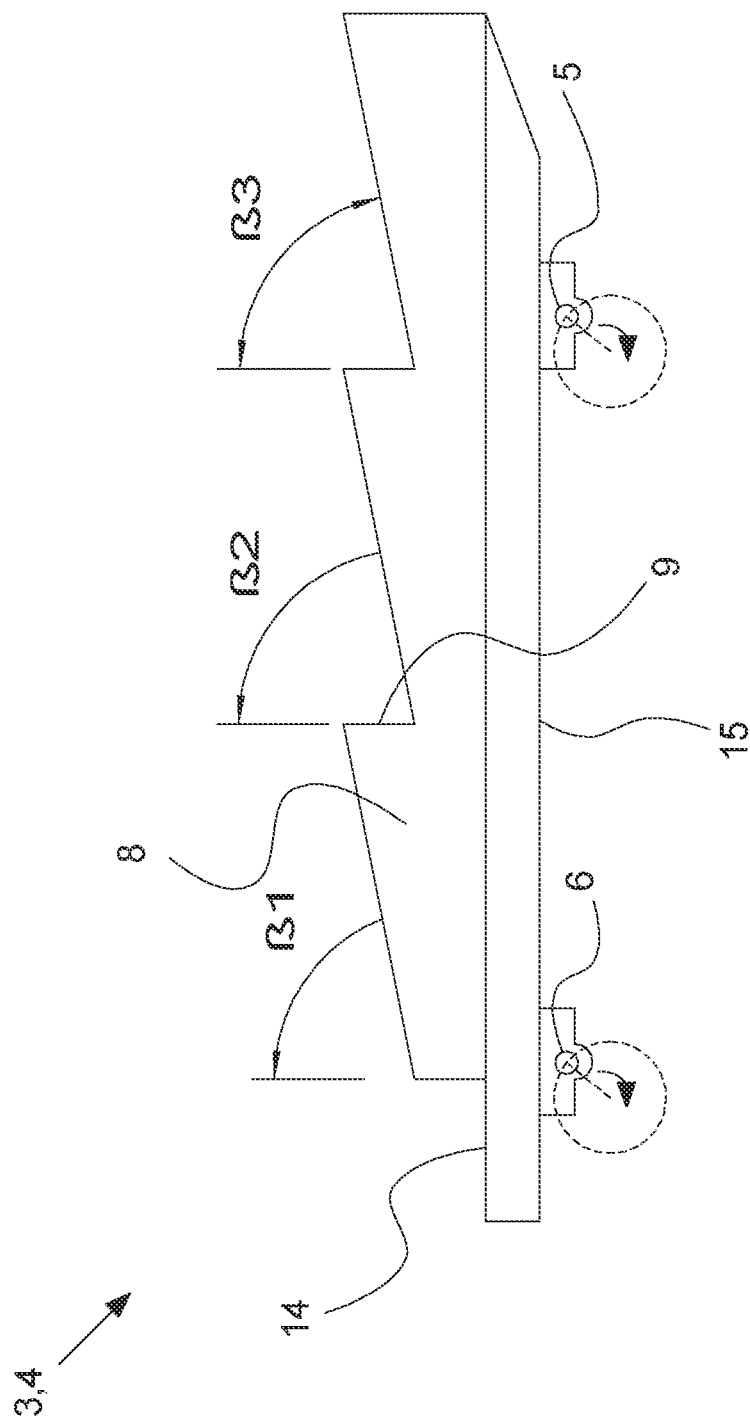
Figure 3:
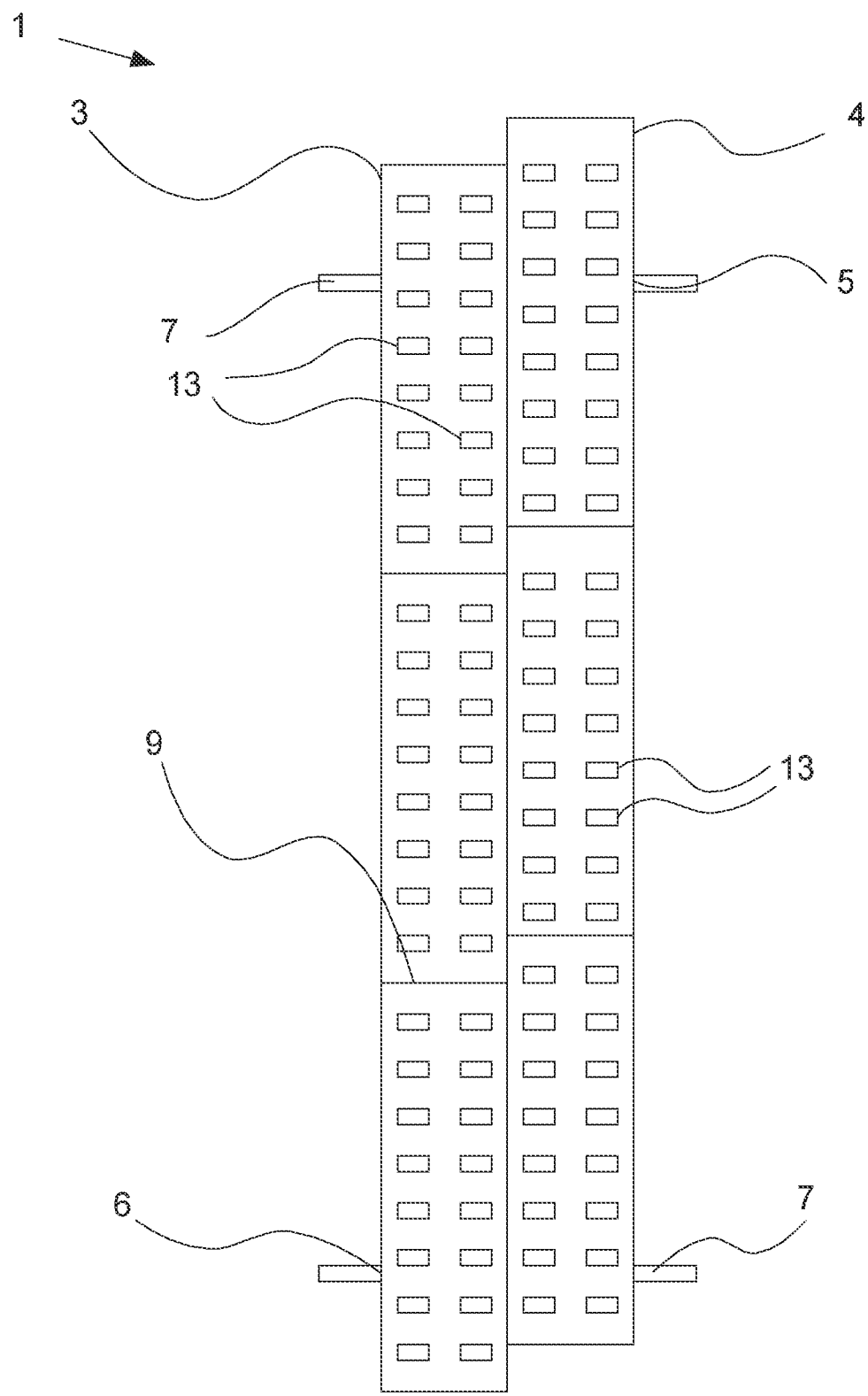
Figure 4:
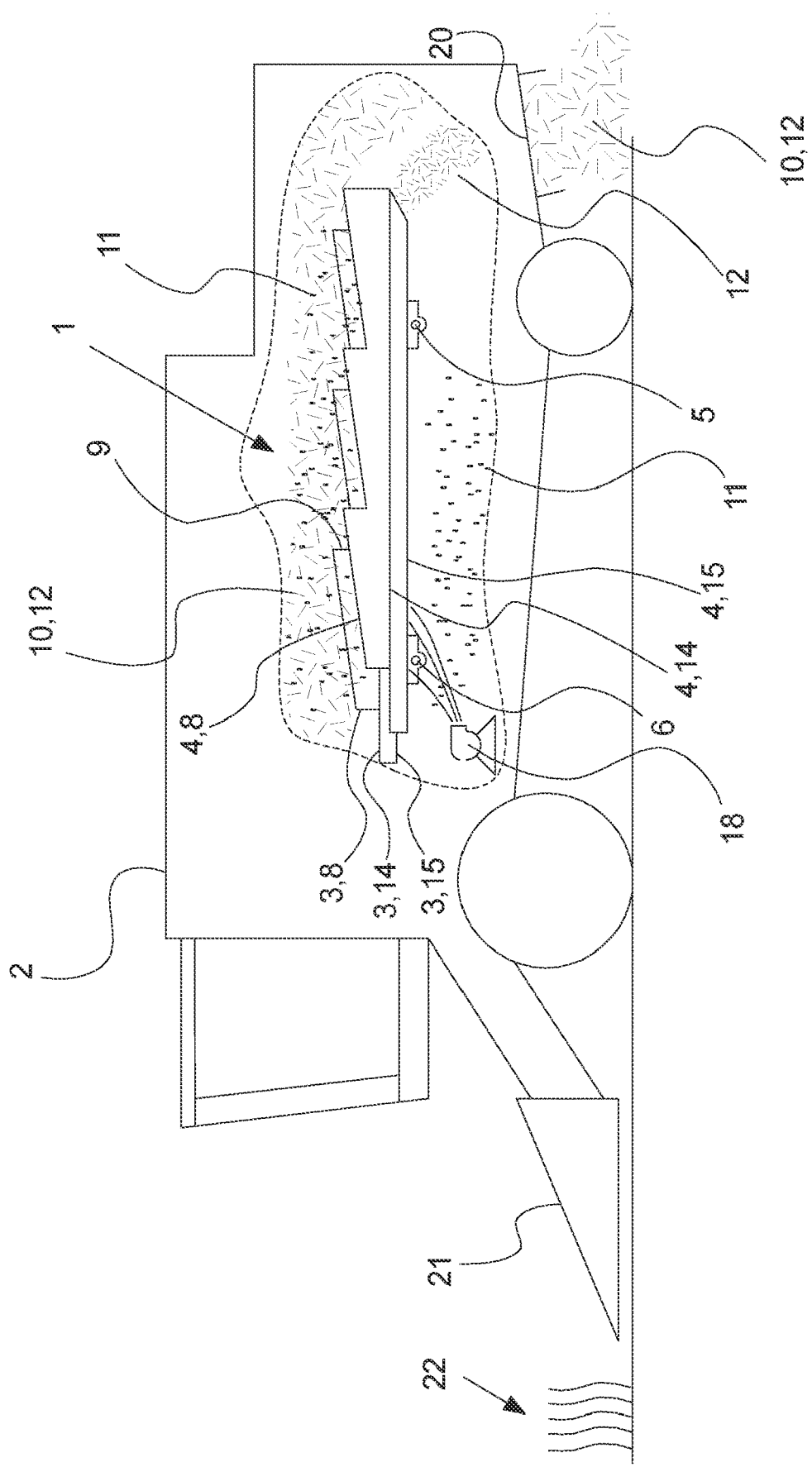
Figure 5:
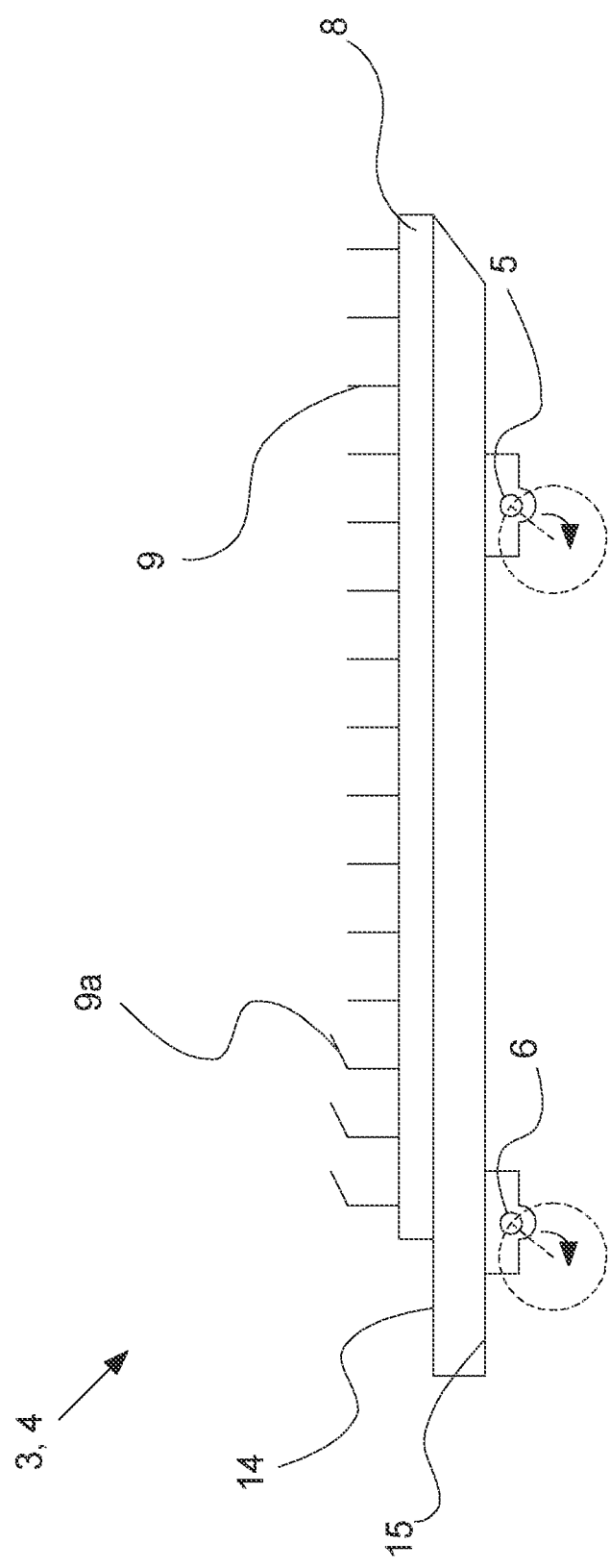

The invention will be described in the following with reference to the figures in which FIG. 1 illustrates a grain separating apparatus as seen in perspective, FIG. 2 illustrates a walker-sieve as seen from the side, FIG. 3 illustrates the grain separating apparatus of as seen from above, FIG. 4 illustrates a broken-out section view of a combine harvester with a grain separating apparatus, and FIG. 5 illustrates an embodiment of the grain separating apparatus with drivers configured as protruding sticks.

DETAILED DESCRIPTION

FIG. 1 illustrates a grain separating apparatus 1 as seen in perspective.

In this embodiment, the walker apertures 13 comprise holes of fixed size on the straw walker. However, in another embodiment, the walker apertures 13 may comprise lamella with gaps wherein the gap size which may be adjustable. In yet another embodiment, the walker apertures 13 could comprise fixed size apertures wherein the individual sizes along the length of the walker-sieve 3, 4 could differ from each other. For example, the walker apertures sizes could be arranged such that a finer and finer sorting of grains and debris along the length of the straw walker 8 is achieved.

Furthermore, the first sieve apertures 16 and second sieve apertures 17 are, in this embodiment, formed by the gaps between mutually displaceable lamellas. Forming the sieve apertures 16, 17 as gaps between the lamellas therefore enables adjusting the sieve aperture size according to different grain sizes. In another embodiment, the first sieve apertures 16 and second sieve apertures 17 could also be holes of fixed size e.g. by punchings, by forming the sieves from sort of mesh or other. However, in another embodiment, the size of the sieve apertures 16,17 may be different from each other, e.g. the first sieve apertures 16 could be larger than the second sieve aperture 17 or the size of the sieve apertures 16,17 could vary across the area of the sieves.

The first sieve apertures 16 and second sieve apertures 17 are, in this embodiment, arranged along the entire length of the first sieve 14 and second sieve 15. However, in another embodiment, the first sieve apertures 16 and second sieve apertures 17 could be arranged to extend only a part of the length of the sieves or they could be dispersed at different areas such as for example in the ends and in the middle of the first sieve.

In this embodiment, the drivers 9 are arranged as teeth protruding from the straw walker surface. However, in another embodiment, the drivers could be arranged as teeth, carrier arms, protruding rods, paddles, sticks or other type of driver on the surface of the straw walker 8 which may be used for conveying straw material 10 and/or the drivers 9 could be formed by the side plates of the walker-sieve 3, 4 extending upwards leaving the top face of the straw walker substantially flat.

Furthermore, in this embodiment, two sieves are arranged under the straw walker 8. However, in another embodiment, one, three, five or any number of sieves may be arranged under the straw walker.

The straw walkers 8 are usually arranged with three functional zones: feeding, separation and discharge, wherein the functional zones may be defined by e.g. the size of the first driver angle $\beta 1$, second driver angle $\beta 2$ and third driver angle $\beta 3$, respectively.

In this embodiment, the driver angles $\beta 1$, $\beta 2$ and $\beta 3$ are identical, however, in another embodiment, the driver angles $\beta 1$, $\beta 2$ and $\beta 3$ may be different from each other or some of the driver angles could be the same but differ from the remaining driver angles. Furthermore, in this embodiment, the straw walker 8 is comprised of three drivers 9. However, in another embodiment, one, two, five, seven or any number of drivers 9 could be provided on the straw walker 8 depending on operational requirements and/or size of the grain separator 1 and/or combine harvester model 2.

The rotational drive mechanism 7 is in this embodiment comprised of a crankshaft with a dedicated driving motor (not shown), and wherein the crankshaft and the motor drives the rotational motion of the walker-sieves 3,4. Each of the walker-sieves 3,4 are connected to the crankshaft via suspension points 5,6 such that the induced circular motions of the suspension points 5 and 6 are out of phase in relation to each other whereby the walking-like motion is obtained for conveying the straw material 10 (not shown).

FIGS. 1 and 3 only disclose two walker-sieves 3, 4 arranged side by side—which could be the total number of walker-sieves 3, 4 in another embodiment of the invention—but in this embodiment, they are only two of several neighboring walker-sieves 3, 4. In another embodiment the grain separating apparatus 1 could comprise between 2 and 30, preferably between 3 and 20 and most preferred between 4 and 12 walker-sieves 3, 4 arranged side by side or even more if e.g. the grain separating apparatus 1 was arranged to comprise more than one layer of walker-sieves 3, 4 arranged side by side. The walker-sieves 3, 4 will typically be arranged to utilize the entire available width inside the combined harvester and if the number of neighboring walker-sieves 3, 4 is too high or too low, the width of the individual walker-sieves 3, 4 will not fit the length of the straw material, at the conveying process and/or the cleaning process will not be as efficient.

FIG. 2 illustrates a walker-sieve 3, 4 as seen from the side.

In this embodiment, the walker-sieve 3,4 is arranged such that both suspension points 5,6 describe a substantially circular motion. However, in another embodiment, only one of the suspension points could be arranged to describe a substantially circular motion while the other suspension point may reciprocate in a linear motion. Furthermore, one or more of the at suspension points may follow an oval, elliptic or any other type of rotational motion. It should also be emphasized, that the suspension points 5,6 may follow different rotational motions individually.

FIG. 3 illustrates the grain separating apparatus 1 as seen from above.

In this embodiment, the walker apertures 13 are formed as rectangular holes in the straw walker 8. However, in another embodiment, the shape of the apertures could be circular, polygonal, triangular or any other shape.

In this embodiment, the walker apertures 13 and sieve apertures 16,17 are evenly distributed in a mesh arrangement. However, the apertures could also be arranged randomly on the sieves 13, 14 and/or the straw walker 10.

FIG. 4 illustrates a broken-out section view of a combine harvester 1 with a grain separating apparatus 1.

The crops 22 are cut by the cutter 21 as the combine harvester 2 moves along the field. The cut crops 22 are transported up and towards the threshing unit (not shown) which threshes the straw material 10 such that grains are loosened from the stalks of the crops 22. Afterwards, the straw material 10, debris 12 and grains 11 are conveyed to the grain separating apparatus 1 wherein the at least two walker-sieves 3,4 of the grain separating apparatus 1 may be arranged to follow an out-of-phase circular motion induced by the rotational motion drivers 7 (not shown) to generate a walking-like motion which will convey the straw material 10 towards the read of the combined harvester 2. The straw walkers 8 of the walker-sieves 3,4 are usually arranged with three functional zones: feeding, separation and discharge i.e. a portion of the straw walker 8 is arranged to feed the straw material 10 towards the separation part where grain and debris may be separated from the straw material 10 through the walker apertures 13. The discharge part of the straw walker 8 discharges the straw material 10 backwards and towards the back end of the combine harvester 2 where the straw material 10 may exit the combine harvester 2 through the outlet 20 or it could be baled up. The grains 11 and debris 12 fall through the walker apertures 13 and are thereby separated from the straw material 10, possibly aided by the blower 18. The grains 11 are further cleaned by the sieves 14,15 by passing through the sieve apertures 16,17 and possibly by the aid of the blower 18. The cleaned grains 11 may fall directly to a grain storage tank (not shown) or may be transported to the grain storage tank e.g. by means of augers.

In this embodiment, the rotational motion driver 7 comprises a crank mechanism. However, in another embodiment, the rotational motion driver 7 could comprise a disc with an eccentric hole, planetary gears, pulley system or any other kind of rotational drive mechanism for inducing the rotational motion of one of the suspension points.

The blower 18 is arranged to establish an adequate flow of air such that the debris 12 are separated from the grains 11. In this embodiment, the blower 18 comprises a radial-flow fan. However, in another embodiment, the blower 18 could comprise an axial-flow fan, cross-flow fan, mixed flow fan, centrifugal blower, compressor or any other type of apparatus which may be used for generating an airflow. Furthermore, the blower 18 could establish the airflow continuously or in portions/pulses.

In this embodiment, the grain separating device 1 is arranged in substantially the middle of the combine harvester 1 for the purpose of illustration. It should be emphasized, that in another embodiment, the grain separating apparatus could also be positioned at the bottom part of the combine harvester, e.g. below the grain storage tank (not shown) or at the substantially top part of the combine harvester, e.g. above the grain storage tank (not shown). The compactness of the cleaning device enables e.g. constructing larger grain storage tanks inside the combine harvester which allows the combine harvester to operate for longer duration of time before having to unload the harvested grain.

In an embodiment, the walker-sieve(s) are arranged so that they may slide into receiving grooves, channels slots or the like (not shown) of the grain separating apparatus 1 so that the walker-sieves may easily be mounted and unmounted so that replacement and service is eased.

FIG. 5 illustrates an embodiment of the grain separating apparatus 1 with drivers 9 configured as protruding sticks.

In this embodiment, the drivers 9 are formed as sticks on the surface of the straw walker 8 and protruding orthogonally away from the at least one sieve as an exemplary alternative embodiment of FIG. 1. In this embodiment, the sticks are protruding away from the surface of the straw walker 8 and orthogonal hereto. However, the sticks could also protrude from the straw walker surface in an angle in relation to the straw walker surface for improved engagement with straw material 10. The sticks could also be provided with driver hooks 9a on some of the drivers 9 or all of the drivers 9.

It should be emphasized, that in this embodiment, fifteen drivers 9,9a are used as an exemplary number of drivers 9. However, in another embodiment the straw walker 8 could comprise three, five, ten, twenty or any number of drivers 9 depending on operational requirements, size of the straw walker 8 and type of crop as this could affect the allowable distance between the drivers 9, e.g. to avoid build-up of straw material at the drivers 9 and thereby hinder effective straw material conveying. The drivers 9 may be attacked to the surface of the straw walker 8 by welding, bolting, clicking, gluing or by any other type of joining process.

The invention has been exemplified above with reference to specific examples of drivers 9, blower 18, rotational motion drive 7 other. However, it should be understood that the invention is not limited to the particular examples described above but may be designed and altered in a multitude of varieties within the scope of the invention as specified in the claims.

LIST

1. Grain separating apparatus
2. Combine harvester
3. First walker-sieve
4. Second walker-sieve
5. First suspension point
6. Second suspension point
7. Rotational motion drive
8. Straw walker
9. Drivers
9a Driver hook
10. Straw material
11. Grain
12. Debris
13. Walker apertures
14. First sieve
15. Second sieve
16. First sieve apertures
17. Second sieve apertures
18. Blower
20. Straw material outlet
21. Cutter
22. Crops
$\beta 1$. First driver angle
$\beta 2$. Second driver angle
$\beta 3$. Third driver angle

The invention claimed is:

1. A grain separating apparatus for a combine harvester, said grain separating apparatus comprising at least a first walker-sieve and a second walker-sieve arranged side by side, wherein said first walker-sieve and said second walker-sieve are suspended in at least two suspension points in said combine harvester, wherein at least one of said two suspension points describes a rotational motion and wherein a rotational motion drive drives said rotational motion of said first walker-sieve out of phase with said rotational motion of said second walker-sieve, wherein each of said at least two walker-sieves include
   a straw walker comprising drivers for conveying a straw material and wherein grain and debris are separated from said straw material through walker apertures in said straw walker, wherein at least a portion of said straw walker is rigidly connected directly on top of, and at least partly aligns with,
   at least one sieve being arranged to separate said grain from said debris.

2. The grain separating apparatus according to claim 1, wherein said rotational motion drive comprises a crank mechanism.

3. The grain separating apparatus according to claim 1 wherein the width of said walker-sieve is between 20 mm and 2000 mm, preferably between 50 mm and 800 mm and most preferred between 100 mm and 450 mm.

4. The grain separating apparatus according to claim 1, wherein said straw walker and said at least one sieve are welded together.

5. The grain separating apparatus according to claim 1, wherein said grain separating apparatus further comprises a blower.

6. The grain separating apparatus according to claim 5, wherein said blower is arranged to form an airflow through said walker apertures and said at least one sieve.

7. The grain separating apparatus according to claim 1, wherein said drivers are formed as teeth extending substantially away from said at least one sieve.

8. The grain separating apparatus according to claim 1, wherein said at least one sieve comprises a first sieve arranged under said straw walker and a second sieve arranged under said first sieve and wherein said first sieve and said second sieve are rigidly connected to each other.

9. The grain separating apparatus according to claim 8, wherein an average size of first sieve apertures in said first sieve is larger than an average size of second sieve apertures in said second sieve.

10. A method for separating grain from straw material in a combine harvester by means of a grain separating apparatus comprising at least a first walker-sieve and a second walker-sieve arranged side by side, wherein each of said first walker-sieve and said second walker-sieve comprise a straw walker comprising drivers for conveying a straw material, wherein at least a portion of said straw walker is rigidly connected directly on top of, and at least partly aligns with, at least one sieve and wherein said first walker-sieve and said second walker-sieve are suspended in at least two suspension points in said combine harvester, said method comprising the steps of conveying said straw material by means of drivers on said straw walkers and by rotating at least one suspension point of said first walker-sieve and said second walker-sieve out of phase with each other to make said walker-sieves describe a walking-like motion, separating grain and debris from said straw material through walker apertures arranged in said straw walkers at least also by means of said walker-like motion, separating said grain from said debris by means of said underlying sieves.

11. The method according to claim 10, wherein grain and debris are also separated from said straw material on said straw walkers by establishing a walker airflow up through said walker apertures towards said straw material.

12. The method according to claim 10, wherein separating said grain from said debris by means of said underlying sieves is aided by establishing a sieve airflow up through said sieves towards said straw walkers.

13. The method according to claim 11, wherein said walker airflow and said sieve airflow are established by the same blower.

14. The method according to claim 10, wherein said method is a method for separating grain from straw material by means of a grain separating apparatus.

\* \* \* \* \*